(12) United States Patent
Larue

(10) Patent No.: US 6,644,426 B1
(45) Date of Patent: Nov. 11, 2003

(54) MOBILITY DEVICE

(76) Inventor: Ward Lincoln Larue, 134 Breeze La., Berkeley Springs, WV (US) 25411

( * ) Notice: Subject to any disclaimer, the term of this patent is extended or adjusted under 35 U.S.C. 154(b) by 0 days.

(21) Appl. No.: 10/268,890

(22) Filed: Oct. 11, 2002

(51) Int. Cl.[7] .............................................. B62D 55/00
(52) U.S. Cl. .................. 180/9.1; 280/DIG. 10
(58) Field of Search ....................... 280/DIG. 10; 180/9, 180/9.1, 9.21, 9.28, 9.3, 9.32, 9.5, 8.7, 907

(56) References Cited

U.S. PATENT DOCUMENTS

| 3,166,138 A | * | 1/1965 | Dunn ........................ 180/9.23 |
| 3,195,910 A | * | 7/1965 | Steiner ...................... 280/5.22 |
| 3,288,234 A | * | 11/1966 | Feliz ......................... 180/9.23 |
| 3,489,236 A | * | 1/1970 | Goodwin ................... 180/9.32 |
| 3,869,011 A | * | 3/1975 | Jensen ....................... 180/9.23 |
| 3,882,949 A | | 5/1975 | Anderson |
| 4,044,850 A | | 8/1977 | Winsor |
| 4,194,584 A | | 3/1980 | Kress et al. |
| 4,432,425 A | | 2/1984 | Nitzberg |
| 4,566,551 A | * | 1/1986 | Feliz ........................... 180/9.1 |
| 4,566,707 A | | 1/1986 | Nitzberg |
| 4,709,773 A | * | 12/1987 | Clement ..................... 180/9.32 |
| 5,158,309 A | * | 10/1992 | Quigg ........................ 180/9.32 |
| 5,335,741 A | * | 8/1994 | Rabinovitz .................. 180/8.2 |
| 5,395,129 A | * | 3/1995 | Kao ........................... 180/9.32 |
| 5,423,563 A | | 6/1995 | Wild |

* cited by examiner

Primary Examiner—Daniel G. DePumpo
(74) Attorney, Agent, or Firm—Merek, Blackmon & Voorhees, LLC

(57) ABSTRACT

A universal adjustable-position mobility device for multiple use applications including robotics, industry and handicapped mobility facilitation. The device can be used to transport objects across varied terrain including inclines and declines and by utilizing a sliding extensible track system can bridge obstacles and traverse mud, sand and snow. The device further incorporates features which allow raising and lowering of the center of gravity of the load. By extending the rear wheels, the angle of the track mechanism relative to the ground to can be adjusted to facilitate engagement of the tracks with an abrupt incline such as when loading a wheelchair onto a vehicle.

20 Claims, 9 Drawing Sheets

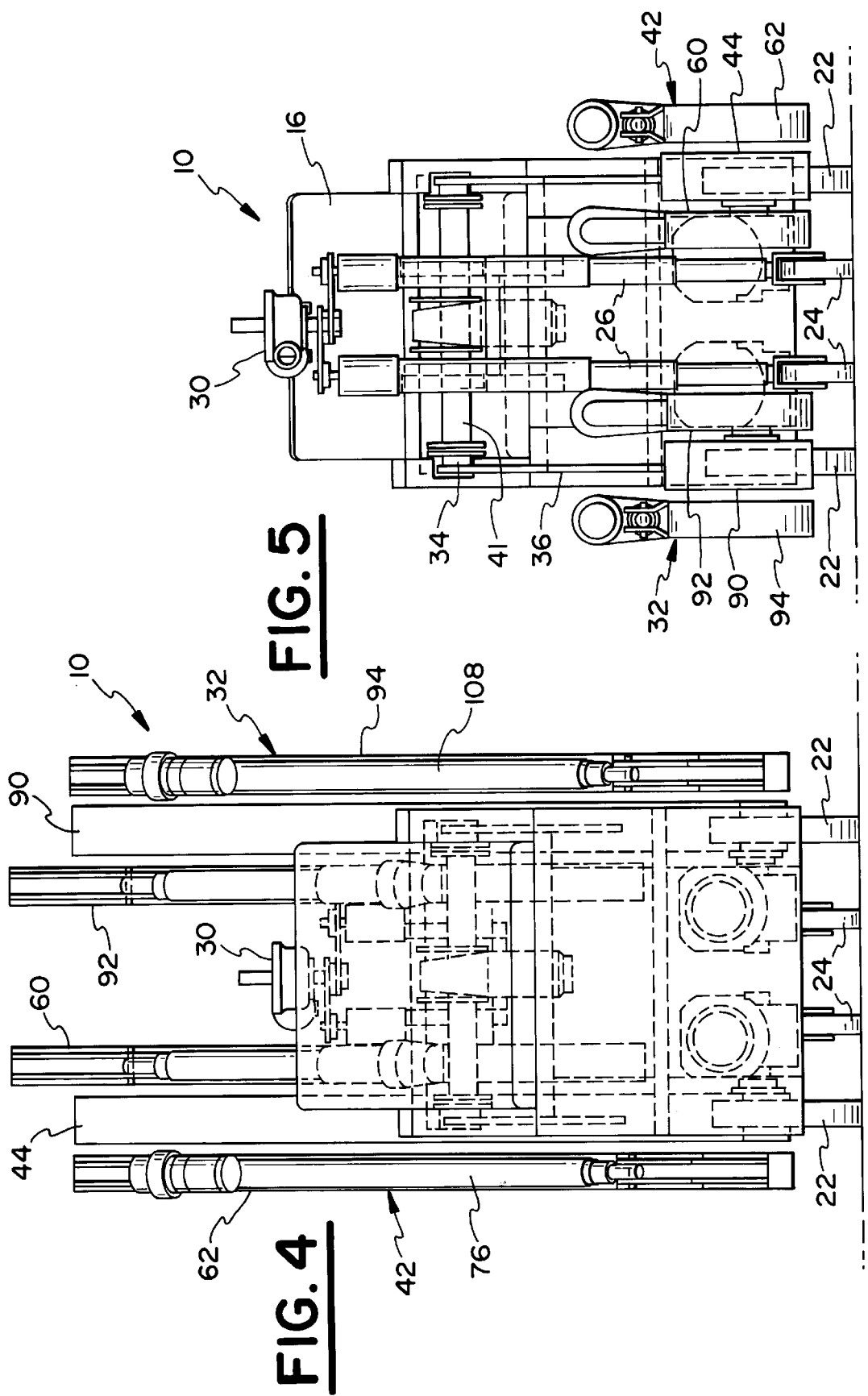

MOBILITY DEVICE

FIELD OF THE INVENTION

The invention relates to motorized land mobility devices for transporting loads over a variety of terrain in robotic, industrial and handicapped uses. In particular, the present invention incorporates a motorized track mechanism for propelling robots and load carrying apparatus.

BACKGROUND OF THE INVENTION

The use of endless traction belts is well known in the field of land vehicles. Endless traction belts have been used in earthmoving equipment as well as in military equipment such as tanks and half-tracks. Endless traction belts have previously been applied in the field of wheel chairs as described in U.S. Pat. No. 4,044,850. In that patent, the wheelchair made use of both conventional wheelchair wheels in combination with an endless track mechanism, but the use of the track mechanism in that patent is limited to incline/decline situations such as stairs and is not used for to overland travel.

These and -other mechanisms have permitted the operator of the machine to navigate inclines and varied terrain. However, none of the prior tracked mechanisms provide for track adjustment capability to enable use of the track mechanism over a variety of terrain.

OBJECTS AND SUMMARY OF THE INVENTION

It is an object of the invention to provide a mobility device capable of traversing a variety of terrain.

It is another object of the invention to provide a mobility device for use in robotics, industry and wheelchairs.

Still another object of the invention is to provide a mobility device having adjustable track mechanisms.

Yet another object of the invention is to provide a mobility device having in combination height adjustable wheels and a track mechanism.

Still another object of the invention is to provide a split track mechanism which can be extended and retracted.

It is a further object of the invention to provide a load carrier that can be adjusted to maintain a horizontal position when the mobility device ascends an incline.

Yet another object of the invention is to provide a system of clutches in combination with the track system to permit turning of the device when being propelled by the track system.

Still another object of the invention is to provide a mobility device which is capable of alternatively wheeled or track propulsion.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, the invention is directed to a universal adjustable-position mobility device for multiple use applications including robotics, industry and handicapped mobility facilitation. The device can be used to transport objects across varied terrain including inclines and declines and by utilizing a sliding extensible track system can bridge obstacles and traverse mud, sand and snow. The device further incorporates features which allow raising and lowering of the center of gravity of the load. By extending the rear wheels, the angle of the track mechanism relative to the ground to can be adjusted to facilitate engagement of the tracks with an abrupt incline such as when loading a wheelchair onto a vehicle.

With these and other considerations in mind, as will become apparent hereinafter, the invention includes certain novel features of construction, combination and arrangement of parts and portions as will be set forth in the appended claims, reference being had to the accompanying drawings and detailed description thereof.

BRIEF DESCRIPTION OF THE DRAWINGS

FIG. 4 is a front view of the mobility device of FIG. 1.

FIG. 5 is a rear view of the mobility device of FIG. 1.

DETAILED DESCRIPTION OF THE INVENTION

The most preferred forms of the invention will now be described with reference to FIGS. 1 through 11. The appended claims are not limited to the most preferred forms and no term used herein is to be given a meaning other than its ordinary meaning unless accompanied by a statement that the term "as used herein is defined as follows".

The mobility device 10 as shown in the accompanying drawings is described with reference to its use as a wheelchair, but it should be understood that various features of the invention are adaptable to other uses such as in the fields of robotics and industry.

Figure 1:
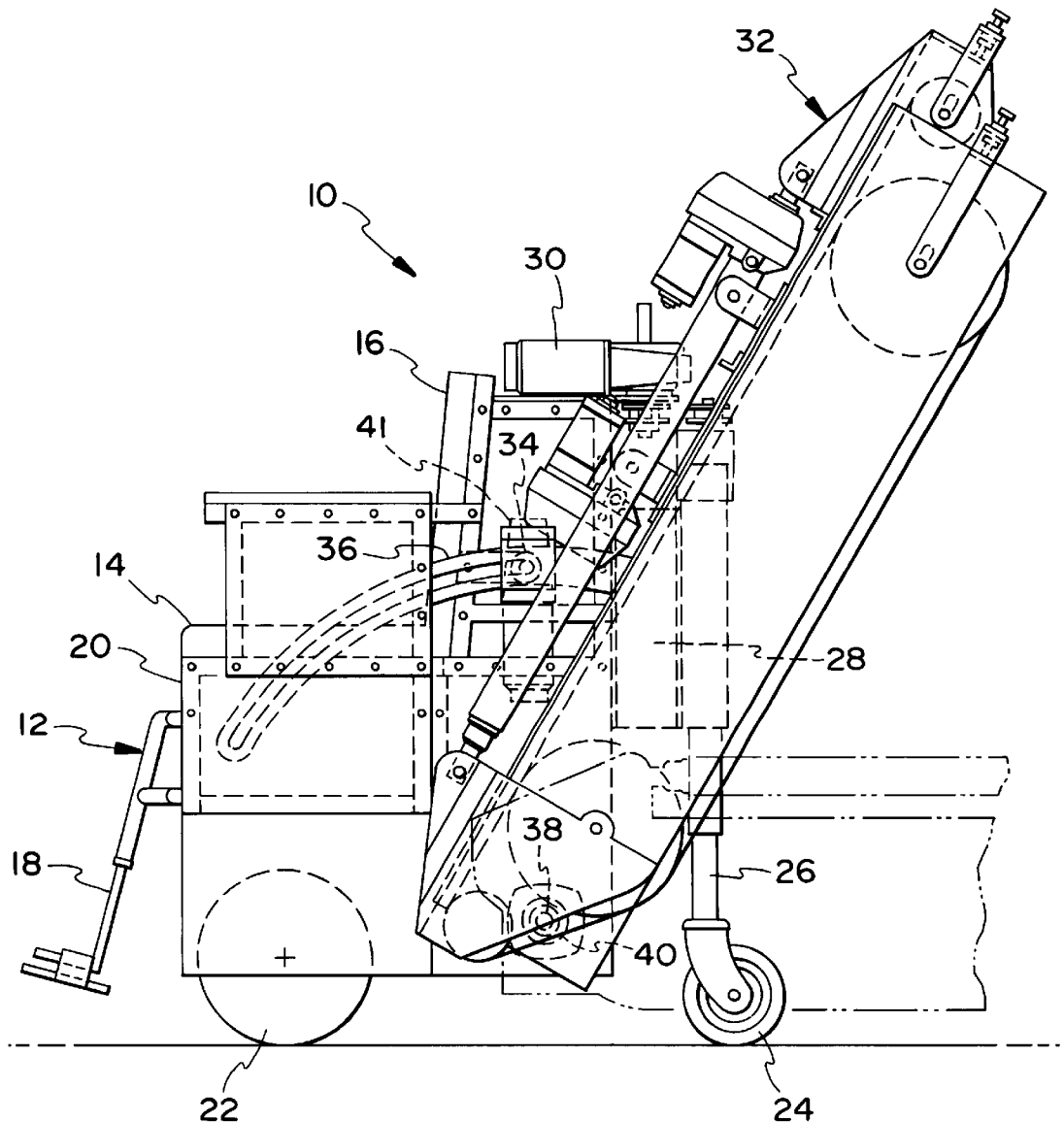
FIG. 1 is a side view of the mobility device configured as a wheelchair.

FIG. 1 shows a mobility device 10 adapted for use as a wheelchair 12 having a seat 14, a backrest 16 and foot rests 18 all supported by a base frame 20. A pair of front drive wheels 22 are positioned beneath the seat 14. A pair of rear wheels 24 are mounted to telescoping shafts 26 connected to frame 20 by braces 28. An electric motor 30 drives the telescoping shafts 26 to raise and lower the rear wheels 24. The telescoping shafts 26 preferably incorporate a screw drive mechanism to extend and retract shafts 26.

A left track mechanism 32 is mounted to the side of the frame 20. As shown in FIG. 1, the left side track mechanism 32 is connected to the frame 20 at two attachment points, a motor-driven toothed spur gear 34 mounted on the frame 20 connects to a toothed arc gear 36 on the track mechanism 32 and a drive shaft 38 connects to the track mechanism drive gear 40. In order for the track mechanism 32 to pivot from the lifted position to the lowered position, the spur gear 34 drives the arc gear 36 to pivot track mechanism 32 down as shown in phantom in FIG. 1. The arc 36 travels along the spur gear 34 about the axis of the drive shaft 38 so that the arc 36. remains equidistant from drive shaft 38 along its entire length as it travels along spur gear 34. The spur gear 34 is powered by an electric drive motor 41, preferably a Superwinch 62/63 series 24 volt motor located behind the backrest 16.

Figure 2:
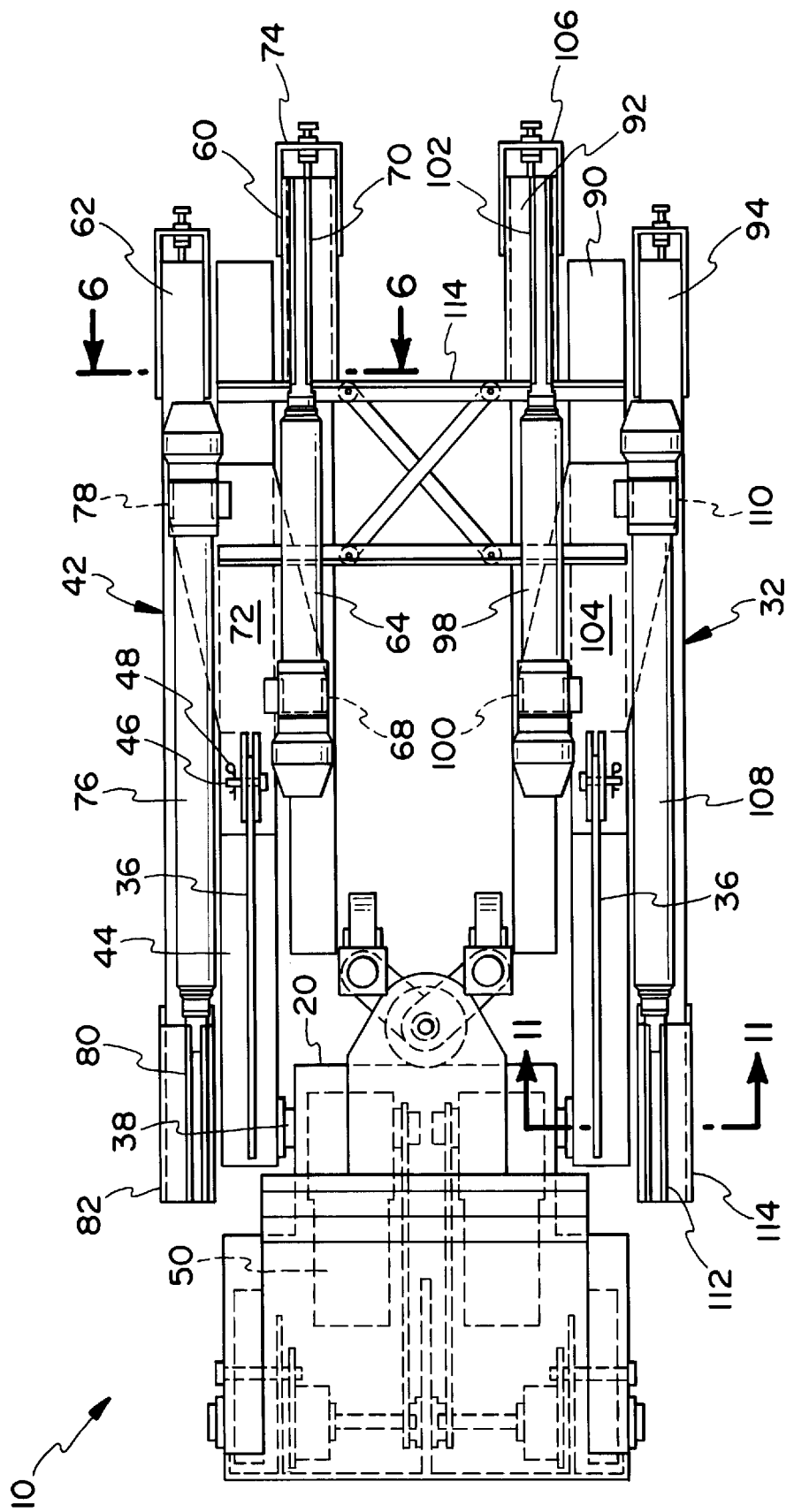
FIG. 2 is a top view of the mobility device of FIG. 1.
Figure 2A:
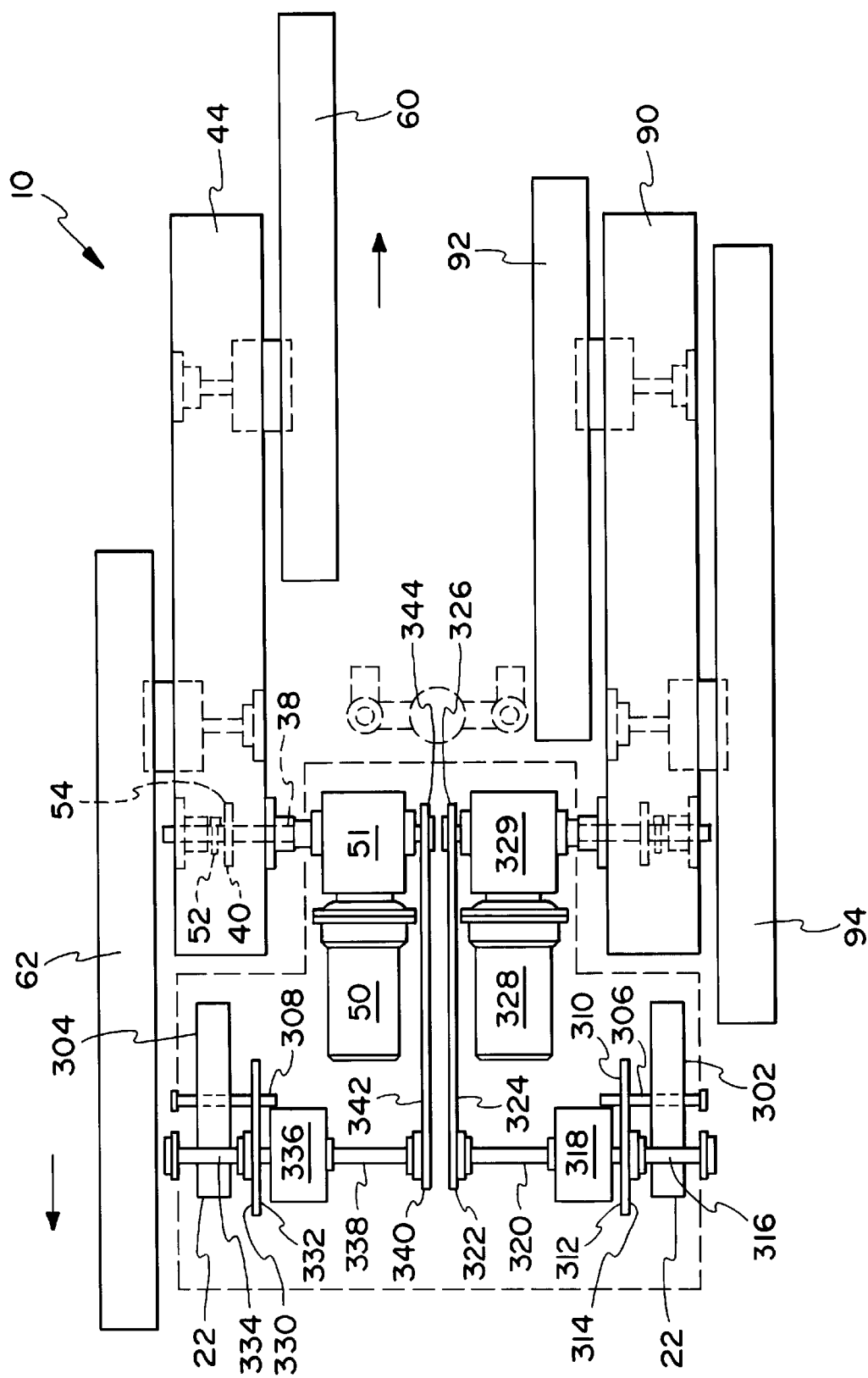
FIG. 2A is a schematic diagram of a top view of the mobility device of FIG. 1

Now with reference to FIGS. 1, 2 and 2A, the mobility device 10 is shown as seen from above includes the left track mechanism 32 and the right track mechanism 42. Right track mechanism 42 includes a central carriage 44 which is removeably connected to arc gear 36 via pins 46 and clips 48. A drive motor 50 and transmission 51 mounted on the base frame 20 and includes a drive shaft 38 extending outwardly therefrom and is removably connected by a pin 52 to track mechanism drive gear 40 which is formed by a sprocket 54.

Right track mechanism 42 includes an inside track carriage 60 and an outside track carriage 62. The inside track carriage 60 is extensible and retractable relative to the central carriage 44 by a screw-driven telescoping extender 64. The telescoping extender 64 includes an electric motor, preferably a 24 volt Superwinch 62/63 series 24 volt motor. The telescoping extender 64 is mounted by a brackets 68 and 70. Bracket 68 is mounted on a brace 72 connected to the central carriage 44. Bracket 70 is mounted near the rear end 74 of inside track carriage 60 with the telescoping extender 64 spanning the brackets 68 and 70. The outside track carriage 62 similarly includes a telescoping extender 76 mounted by brackets 78 and 80 with bracket 78 mounted to brace 72 and bracket 80 mounted to the forward end 82 of outside track carriage 62. Each of the telescoping extenders 64 and 76 are moveable independently of each other so that either the inside track carriage 60 or the outside track carriage 62 may be extended or retracted relative to the central carriage 44. It should also be understood that each of the inside track carriage 60 and the outside track carriage 62 may be moved in incremental amounts to vary the distance extended or retracted.

Left track mechanism 32 includes a central carriage 90, an inside track carriage 92 and an outside track carriage 94. The inside track carriage 92 is extensible and retractable relative to the central carriage 90 by a screw-driven telescoping extender 98. The telescoping extender 98 includes an electric motor, preferably of the model manufactured by Nook Industries named the 24 volt Actionjac electric cylinder series CC. The telescoping extender 98 is mounted to the central carriage 90 by brackets 100 and 102. Bracket 100 is mounted on a brace 104 connected to the central carriage 90. Bracket 102 is mounted near the rear end 106 of inside track carriage 92 with the telescoping extender 98 spanning the brackets 100 and 102. The outside track carriage 94 similarly includes a telescoping extender 108 mounted by brackets 110 and 112 with bracket 110 mounted to brace 104 and bracket 112 mounted to the forward end 114 of outside track carriage 94. Each of the telescoping extenders 98 and 108 are moveable independently of each other so that either the inside track carriage 92 or the outside track carriage 94 may be extended or retracted relative to the central carriage 96. It should also be understood that each of the inside track carriage 92 and the outside track carriage 94 may be moved in incremental amounts to vary the distance extended or retracted. Central carriages 44 and 90 are connected by bracket 114 which extends between left track mechanism 32 and right track mechanism 42.

Figure 3:
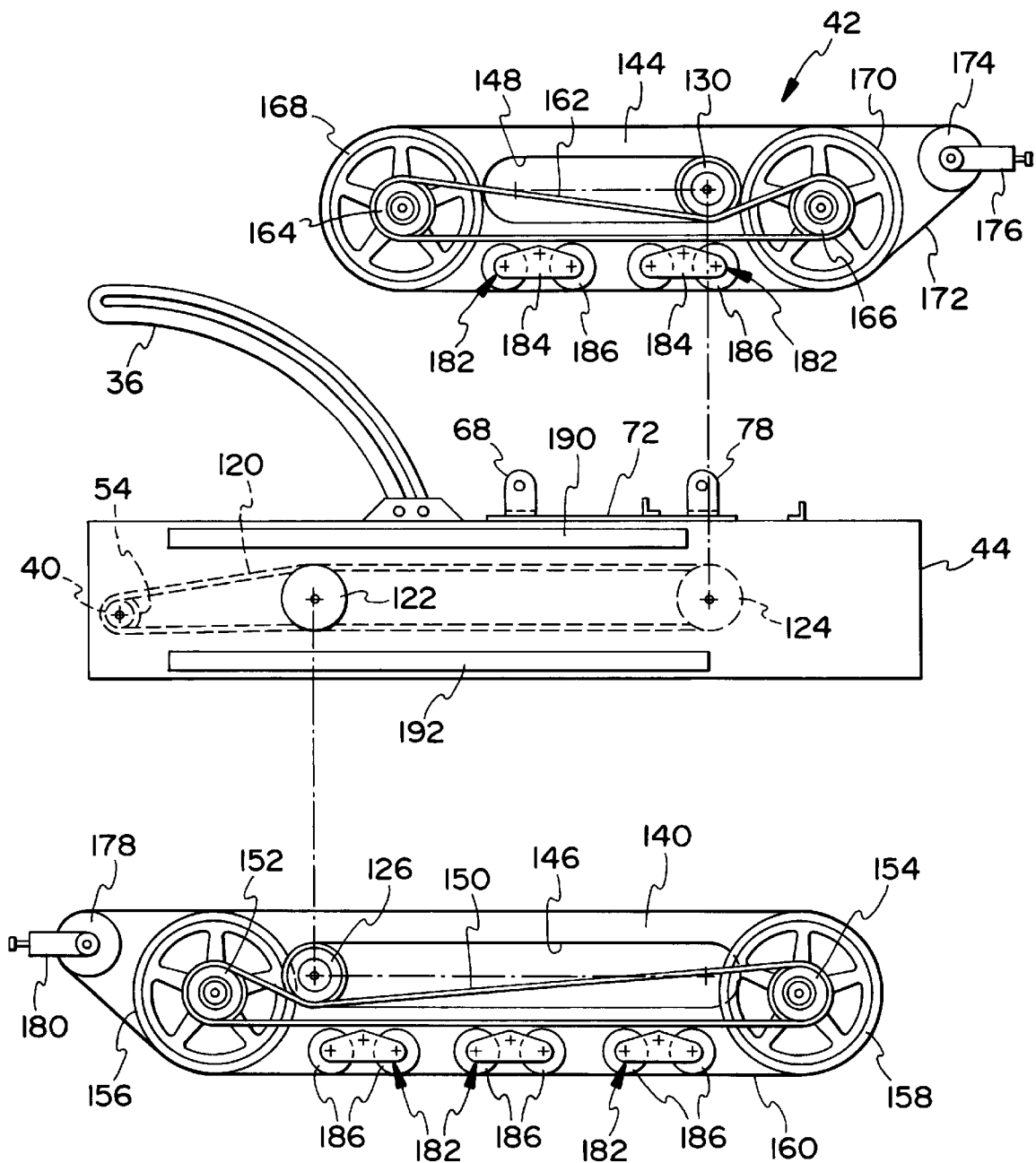
FIG. 3 is an exploded view of the track mechanism of the mobility device of FIGS. 1 and 2.
Figure 6:
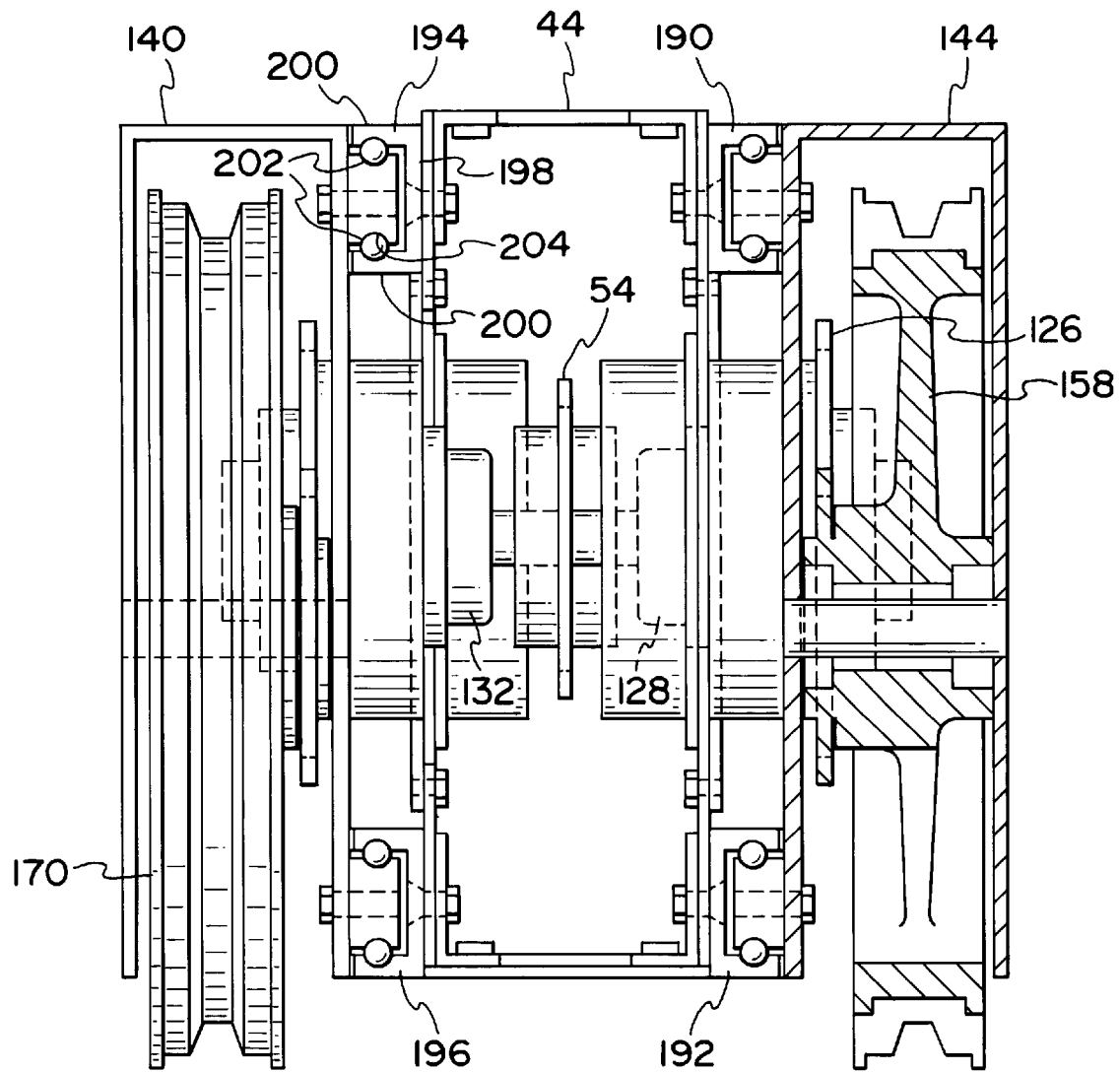
FIG. 6 is a sectional view of one side of the track mechanism taken along lines 6—6 of FIG. 2.

Now as an example, the right track mechanism 42 of the right shall be described with reference to FIGS. 3 and 6. The central carriage 44 includes the arc gear 36 and the drive gear 40 which connect the central carriage 44 to the base frame. A chain 120 connects sprocket 54 to both the front track drive sprocket 122 and rear track drive sprocket 124 both of which are mounted to the central carriage 44.

The front track drive sprocket 122 is connected to the front track drive gear 126 via a clutch mechanism 128. The rear track drive sprocket 124 is connected to the rear track drive gear 130 by clutch mechanism 132. Clutch mechanisms 128 and 132 are preferably Inertial Dynamics Clutch BSL 42 24 volt clutches and permit either the inside track or the outside track to be disengaged from the front track drive sprocket 122 or the rear track drive sprocket 124 for various maneuvers which will be described hereinafter. Each of the inside track mechanism 60 and the outside track mechanism 62 includes a housing 140 and 144 respectively. Housing 140 includes a slot 146 therein to allow movement of the housing 140 relative to the rear track drive sprocket 124. Housing 144 includes a slot 148 therein to allow movement of housing 144 relative to front track drive sprocket 122.

Front track drive gear 126 engages a chain 150 which drives outside track front pulley sprocket 152 and outside track rear pulley sprocket 154. Pulley sprockets 152 and 154 turn their respective pulleys 156 and 158 so that outside track belt 160 can rotate to propel the mobility device 10. Rear track drive gear 130 engages a chain 162 which drives inside track front pulley sprocket 164 and inside track rear pulley sprocket 166. Pulley sprockets 164 and 166 turn their respective pulleys 168 and 170 so that inside track belt 172 can rotate to propel the mobility device 10. The inside track housing 140 includes a tensioning wheel 174 rotatably mounted thereon for maintaining tension on the track belt 172. A tension adjustment screw 176 is mounted on the housing 144 and connected to the tensioning wheel 174 for adjusting the tensioning wheel forwardly and rearwardly to apply proper tension on the inside track belt 172. The outside track housing 140 includes a tensioning wheel 178 rotatably mounted thereon for maintaining tension on the outside track belt 160. A tension adjustment screw 180 is mounted on the housing 140 and connected to tensioning wheel 178 for adjusting the tensioning wheel 178 forwardly and rearwardly to apply proper tension to track belt 160. The inside track housing 144 includes a pair of belt tighteners 182 to assist in maintaining the inside track belt 172 with the ground. Each belt tightener 182 is formed from a triangular piece 184 pivotally mounted to the housing 144 and a pair of wheels 186 mounted thereon for engaging the inside track belt 172. The outside track housing 140 includes three belt tighteners 182. The inside track housing 144 is slidably connected to the central carriage 44 by an upper slide rail 190 and a lower slide rail 192. Similarly, outside track housing 140 is connected to the central carriage by an upper slide rail 194 and a lower slide rail 196. Each of the slide rails 190, 192, 194 and 196 are equivalently constructed in that each has a U-shaped member 198 having upper and lower guide bars 200 extending nearly the length of the central carriage 44 with the open side of the U-shaped member extending away from the central carriage 44. The inside and outside track housings 140 and 144 includes a plurality of rollers 202 mounted to face its respective slide rails 190 and 192, 194 and 196 wherein each of the rollers 202 is formed with a groove 204 to retain the rollers 202 in the slide rails 190, 192, 194 and 196. The slide rails are preferably of the Rollon Telescopic Rail ASN Series ASN 43 style manufactured by Rollon Corporation of Sparta, N.J.

Figure 11:
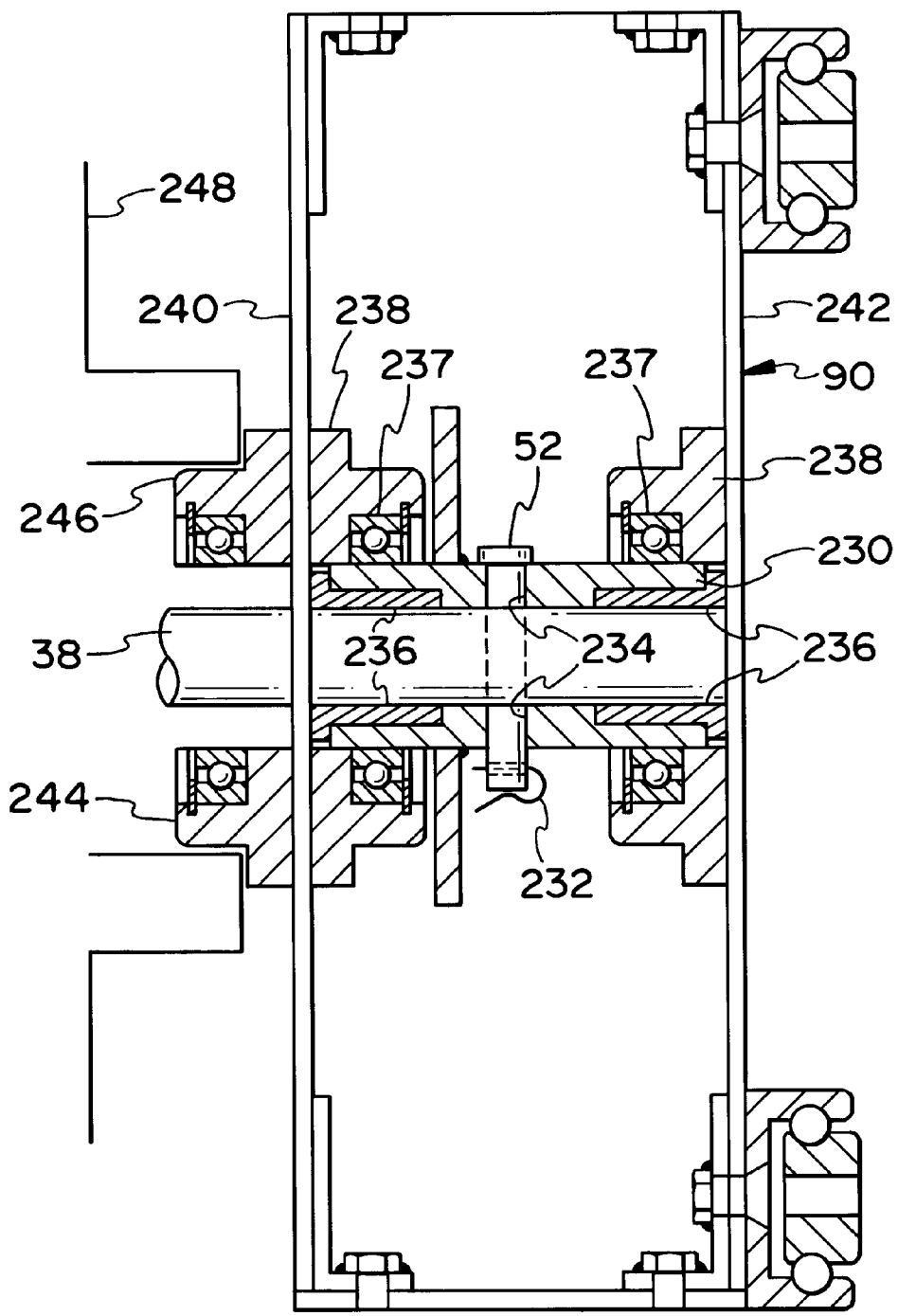
FIG. 11 is a sectional view of the central carriage of the mobility device taken along lines 1—1 of FIG. 2.

Now referring to FIG. 11, the drive shaft 38 extends into a sleeve 230 in central carriage 90 and is removably connected by a clevis pin 52 and clip 232 extending through holes 234 in sleeve 230. Bearings 236 support the drive shaft 38 within the central carriage 90. The bearings are preferably Quality Flanged Sleeve Bearing-Self Lubricating PF12168. Sleeve 230 is supported within central carriage 90 by a pair of fit bearings 237 held by races 238 rigidly joined to both the inside central carriage wall 240 and outside carriage wall 242. Drive gear 40 is rigidly connected to the sleeve 230. Outside bearing race 244 is rigidly connected to inside central carriage wall 240. Bearing race 244 includes a shoulder 246 sized for insertion into a female reception unit 248 to support the central carriage 90 without applying load to the drive shaft 38.

It should be understood that the left side track mechanism 32 is constructed similarly and operates in a similar fashion as the right side track mechanism 42 as has been described.

Now referring back to FIG. 2A, the operation of the front drive wheels 22 will be further explained. Front drive wheels 22 include a left wheel 302 and a right wheel 304. Left wheel 302 is driven by a drive shaft 306 and right wheel 304 is driven by shaft 308. A sprocket 310 on shaft 306 is driven by a chain 312 extending from drive sprocket 314 mounted on drive shaft 316 extending from clutch 318. Drive shaft 320 extends from clutch 318 to drive sprocket 322 which is connected by drive chain 324 extending from drive sprocket 326 on motor 328. Motors 50 and 328 are preferably Micromo Electronics, Inc. PM DC Motor Series. GSN 8070 24 volt DC motors. The transmissions 51 and 329 used with motors 50 and 328 respectively are preferably Indiana Power Transmission System Model ICS Size 50. The right wheel 304 is likewise propelled by driveshaft 308 which includes a sprocket 330 connected by a drive chain 332 to driveshaft 334 extending outwardly from clutch 336. Driveshaft 338 extends from clutch 336 and includes a drive sprocket 340 connected by a chain 342 to a sprocket 344 at drive motor 50. Clutches 318 and 336 allow the driving force from the motors 50 and 328 to be selectively disengaged from the wheels 302 and 304. Clutches 318 and 336 are preferably Inertial Dynamics model BSL42 24 volt clutches.

A power source is provided by a 24 volt battery system 400 preferably located under the seat of the mobility device 10. The various motors and clutches are preferably controlled by a programmable actuation system 402 which may be overridden or reprogrammed by the user. Preferably, an operating console 404 is attached to one arm of the chair so that a seated occupant may operate the mobility device 10. It should be understood that the while the electrical wiring and circuitry have not been shown, the various electrical components would be electrically connected to the power source 400.

The mobility device 10 is preferably about 30.5 inches wide and about 39.5 inches high when the track mechanisms 32 and 42 are in the down position. The track mechanisms are about 60 inches long in the retracted position and can variably extend up to a length of about 100 inches. However, it should be understood that depending on the use or application of various features of the mobility device 10 and, in particular the track mechanisms 32 and 42, in other fields such as robotics and industry, the adjustment to the length of the track mechanisms 32 and 42 and other motor driven features may be accomplished alternatively by hydraulic or electrostatic drive mechanisms. Further, the length and width of the track mechanisms 32 and 42 may be altered for particular applications in robotics, industry and exploration. It should also be understood that some or all of the motorized functions of the mobility device 10 could be operated by remote control devices.

Figure 7:
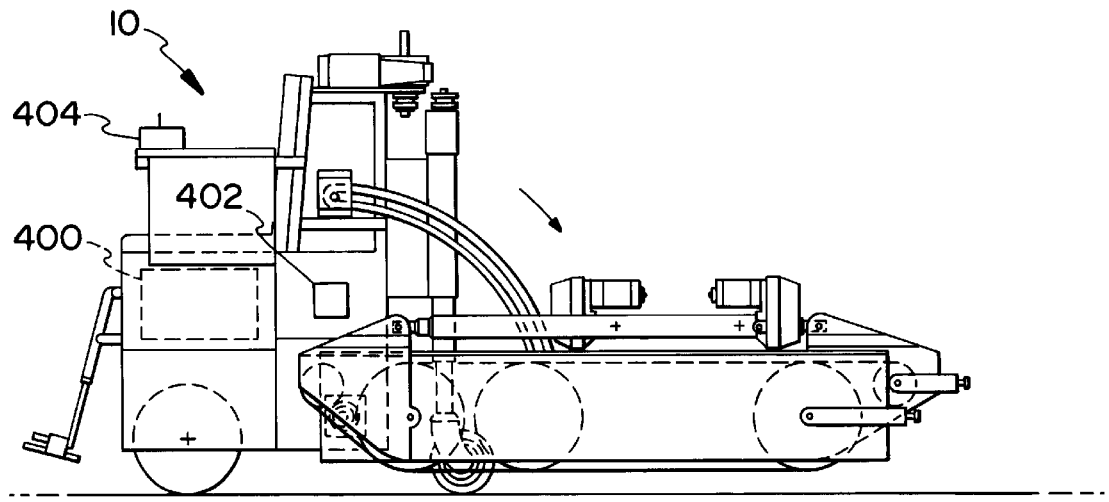
FIG. 7 is a side view of the mobility device having the track mechanism lowered in a horizontal retracted position.
Figure 8:
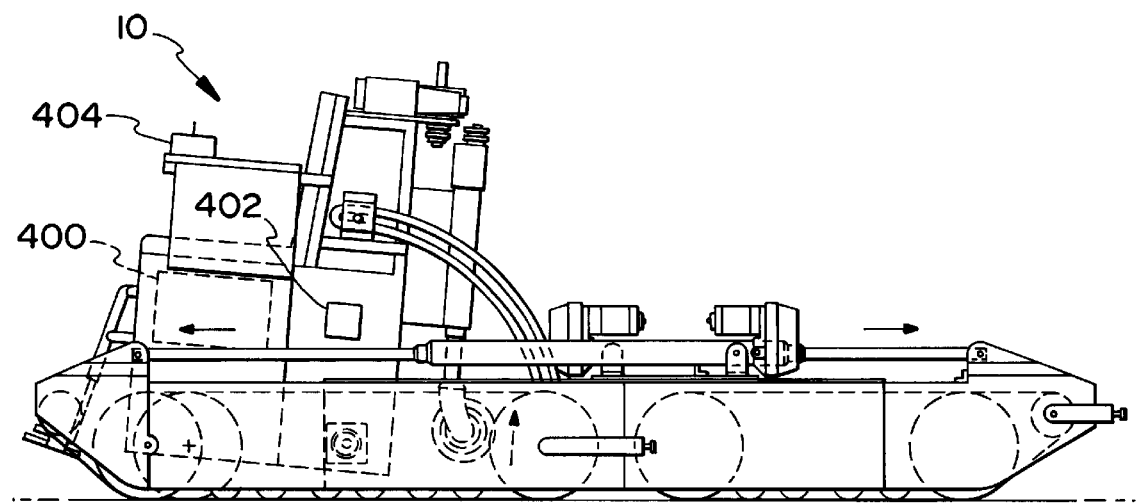
FIG. 8 is a side view of the mobility device of FIG. 8 wherein the tracks are extended.
Figure 9:
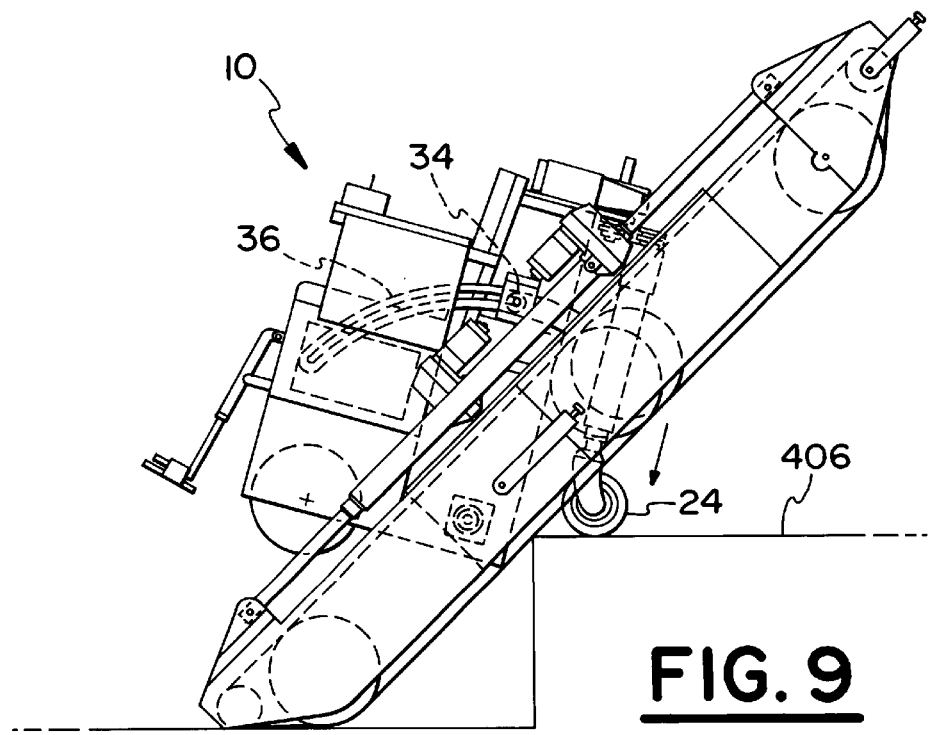
FIG. 9 is a side view of the mobility device being used to ascend a step.

The operation of the mobility device 10 will now be described with reference to FIGS. 7 through 10. FIG. 7 shows the mobility device with the tracks lowered in the retracted position. FIG. 8 shows the tracks extended for travel over soft terrain or to span a hole or ditch. FIG. 9 shows the mobility device 10 being used to ascend a large (up to 18 inches) step 406 wherein the operation is conducted by using the spur gear 34 to retract the track mechanisms into the upright position, backing up to the step 406 and then extending the outside tracks to push the seat up to a position where the rear wheels 24 can be lowered to engage the top of the step 406 and as the weight of the occupant is over the step the tracks can be rotated to the horizontal position and the rear wheels 24 simultaneously raised and the mobility device 10 can be backed onto the top of the step 406. It should be understood that this maneuver could be programmed into the mobility device or accomplished by remote control wherein the step is a van or other vehicle.

Figure 10:
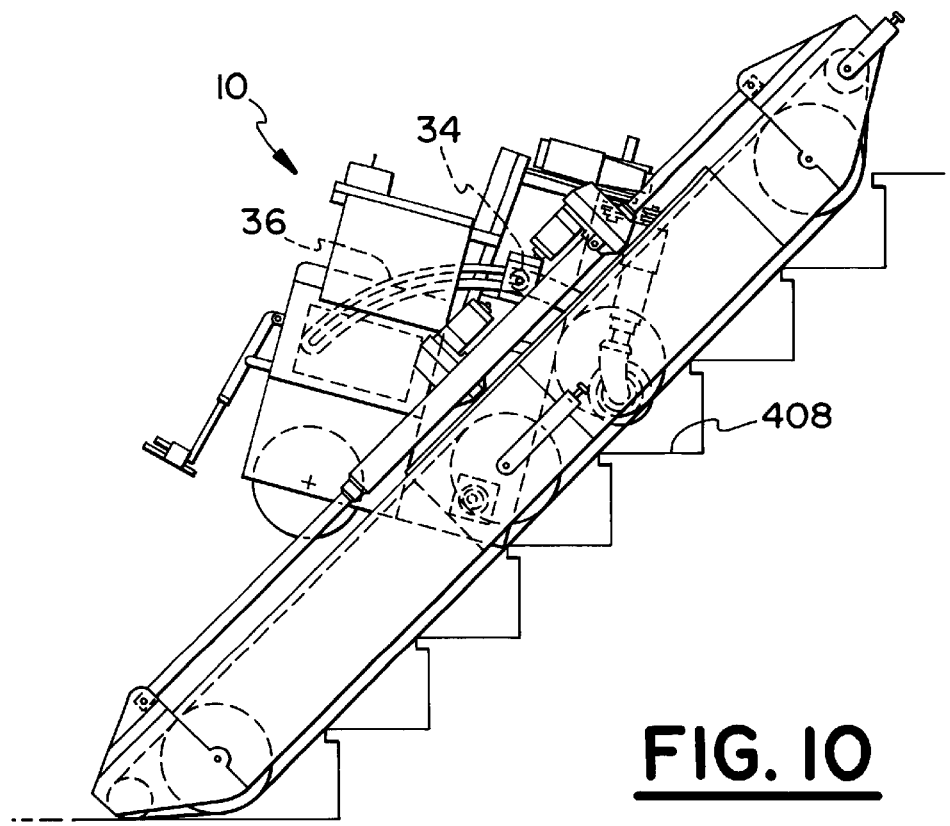
FIG. 10 is a side view of the mobility device ascending a set of stairs.

FIG. 10 shows the mobility device 10 used to ascend a staircase 408. The approach to the staircase 408 would be the same as to a large step, however in this case the tracks would merely climb the steps as if they were a hill. The spur gear 34 and arc gear 36 can be used to adjust the angle of the seat so that the occupant remains in a comfortable position.

While this invention has been described as having a preferred design, it is understood that it is capable of further modifications, uses and/or adaptations of the invention following in general the principle of the invention and including such departures from the present disclosure as come within the known or customary practice in the art to which the present invention pertains and as maybe applied to the central features hereinbefore set forth, and fall within the scope of the invention and the limits of the appended claims.

I claim:

1. A mobility device comprising:
   a) a frame for supporting a pair of motorized track mechanisms;
   b) at least a first motor mounted to said frame for supplying power to said motorized track mechanisms;
   c) each of said track mechanisms including a track support carriage mounted to said frame;
   d) a pair of tracks mounted to said track support carriage;
   e) said pair of tracks forming an inside track and an outside track whereby said track support carriage is located between said tracks;
   f) at least one of said inside tracks and said outside tracks being extendable and retractable relative to said track support carriage; and,
   g) at least one of said inside and outside tracks being slidably connected to said support carriage to facilitate movement of at least one of said inside and outside tracks.

2. The mobility device as set forth in claim 1, wherein;
   a) said inside and outside tracks are independently extendable and retractable relative to said support carriage.

3. The mobility device as set forth in claim 1, further comprising:
   a) a pair of front wheels and a pair of rear wheels connected to said frame.

4. The mobility device as set forth in claim 1, further comprising:
   a) a pair of front wheels are connected to a motor whereby power is supplied to said pair of front wheels for rotational movement to cause said movement of the mobility device.

5. The mobility device as set forth in claim 1, wherein:
   a) a pair of rear wheels are mounted to said frame for telescoping vertical movement.

6. The mobility device as set forth in claim 1, further comprising:
   a) a load support connected to said frame.

7. The mobility device as set forth in claim 6, wherein:
   a) said load support is a chair.

8. The mobility device as set forth in claim 1, wherein:
   a) one of said pair of track mechanisms is driven by said first motor and the other of said pair of track mechanisms is driven by a second motor.

9. The mobility device as set forth in claim 1, further comprising:
   a) a track mechanism adjustment device mounted to said frame for raising and lowering said pair of track mechanisms.

10. The mobility device as set forth in claim 9, wherein:
    a) said track mechanism adjustment device includes a pair of arcuate gears for raising and lowering said pair of track mechanisms in an arc.

11. The mobility device as set forth in claim 10, wherein:
    a) each of said track mechanisms is driven by a separate motor;
    b) each of said separate motor includes a drive shaft having a longitudinal axis; and,
    c) each of said arcuate gears forms an arc about said longitudinal axis of said drive shaft.

12. The mobility device as set forth in claim 1, further comprising:
    a) an inside track extension motor and an outside track extension motor are mounted on each track support carriage;
    b) an inside track extender is connected from said inside track extension motor to said inside track and an outside track extender is connected to said outside track; whereby upon actuation of said inside track extension motor said inside track may be extended relative to said track support carriage and upon actuation of said outside track extension motor said outside track may be extended relative to said track support carriage.

13. The mobility device as set forth in claim 1, further comprising:
    a) a power source for providing electricity to the mobility device.

14. The mobility device as set forth in claim 13, wherein:
    a) said power source is a battery.

15. The mobility device as set forth in claim 13, wherein:
    a) said power source is a 24 volt battery carried by said frame.

16. The mobility device as set forth in claim 1, further comprising:
    a) a programmable actuation system for operating said mobility device.

17. The mobility device as set forth in claim 1, further comprising:
    a) an operating console mounted to said frame for controlling said mobility device.

18. The mobility device as set forth in claim 1, wherein:
    a) said inside and outside tracks have a housing connected to said track support carriage by slide rails.

19. The mobility device as set forth in claim 1, wherein:
    a) said inside and outside tracks each have a housing having a slot therein for facilitating sliding movement of said housing relative to said track support carriage.

20. The mobility device as set forth in claim 1, wherein:
    a) a drive shaft extends from said first motor mounted on said frame to said track support carriage;
    b) said track support carriage having a sleeve for receiving said drive shaft; and
    c) a removeable fastener connecting said drive shaft to said track support carriage.

* * * * *